United States Patent
Antchak et al.

(10) Patent No.: US 8,888,619 B2
(45) Date of Patent: Nov. 18, 2014

(54) OVER-RUNNING DECOUPLER WITH TORQUE LIMITER

(75) Inventors: John R. Antchak, Aurora (CA); Jun Xu, Woodbridge (CA)

(73) Assignee: Litens Automotive Partnership, Woodbridge (CA)

( * ) Notice: Subject to any disclaimer, the term of this patent is extended or adjusted under 35 U.S.C. 154(b) by 262 days.

(21) Appl. No.: 13/123,806

(22) PCT Filed: Oct. 27, 2009

(86) PCT No.: PCT/CA2009/001803
§ 371 (c)(1), (2), (4) Date: Apr. 12, 2011

(87) PCT Pub. No.: WO2010/048732
PCT Pub. Date: May 6, 2010

(65) Prior Publication Data
US 2011/0224038 A1    Sep. 15, 2011

Related U.S. Application Data

(60) Provisional application No. 61/108,600, filed on Oct. 27, 2008.

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *F16D 3/00* | (2006.01) |
| *F16H 55/14* | (2006.01) |
| *F16H 55/36* | (2006.01) |
| *F16D 7/02* | (2006.01) |
| *F16D 41/20* | (2006.01) |

(52) U.S. Cl.
CPC ............. *F16D 7/022* (2013.01); *F16D 41/206* (2013.01)
USPC .................................................. 474/74; 474/94

(58) Field of Classification Search
CPC .... F16H 55/36; F16H 2055/366; F16H 55/14
USPC ........................................................ 474/94, 74
See application file for complete search history.

(56) References Cited

U.S. PATENT DOCUMENTS

| | | | |
|---|---|---|---|
| 2,559,400 A | * | 7/1951 | Clark ............................... 73/161 |
| 2,761,547 A | * | 9/1956 | Gehrer .......................... 198/780 |

(Continued)

FOREIGN PATENT DOCUMENTS

| | | |
|---|---|---|
| CN | 1890479 A1 | 1/2007 |
| EP | 1772644 | 11/2007 |

(Continued)

OTHER PUBLICATIONS

CN 200980142270.3, Office Action with Search Report, Mar. 26, 2013.

*Primary Examiner* — Henry Liu
(74) *Attorney, Agent, or Firm* — Millman IP Inc.

(57) ABSTRACT

A method for producing an over-running decoupler that is configured to transmit rotary power between a rotary member and a hub. The over-running decoupler includes a one-way clutch having a clutch spring, a carrier that is coupled to the clutch spring and at least one spring that resiliently couples the carrier to the hub. The method includes: establishing a desired fatigue life of the at least one spring; establishing a design deflection of the at least one spring during resonance, wherein deflection of the at least one spring at the design deflection during resonance does not reduce a fatigue life of the at least one spring below the desired fatigue life; and preventing resonance in the over-running decoupler by controlling a maximum deflection of the at least one spring such that the maximum deflection is less than or equal to the design deflection.

14 Claims, 6 Drawing Sheets

(56) References Cited

U.S. PATENT DOCUMENTS

| | | | | |
|---|---|---|---|---|
| 2,899,193 | A * | 8/1959 | Foster | 267/156 |
| 3,047,280 | A * | 7/1962 | Pernetta | 267/156 |
| 3,602,205 | A * | 8/1971 | Turkish | 123/90.65 |
| 3,618,730 | A | 11/1971 | Mould | |
| 4,743,178 | A * | 5/1988 | Sheng | 417/416 |
| 4,750,871 | A * | 6/1988 | Curwen | 417/418 |
| 5,139,463 | A * | 8/1992 | Bytzek et al. | 474/69 |
| 5,682,132 | A * | 10/1997 | Hiroyoshi et al. | 340/407.1 |
| 5,702,314 | A * | 12/1997 | Schmid | 474/94 |
| 5,749,449 | A | 5/1998 | Kearney et al. | |
| 6,044,943 | A | 4/2000 | Bytzek | |
| 6,047,811 | A * | 4/2000 | Zittel et al. | 198/763 |
| 6,083,130 | A * | 7/2000 | Mevissen et al. | 474/70 |
| 6,161,512 | A * | 12/2000 | Beels Van Heemstede | 123/90.31 |
| 6,394,248 | B1 * | 5/2002 | Monahan et al. | 192/41 S |
| 6,659,248 | B2 | 12/2003 | Terada | |
| 6,710,489 | B1 * | 3/2004 | Gabrys | 310/90.5 |
| 7,070,033 | B2 * | 7/2006 | Jansen et al. | 192/41 S |
| 7,153,227 | B2 | 12/2006 | Dell et al. | |
| 7,191,880 | B2 | 3/2007 | Liston et al. | |
| 7,207,910 | B2 | 4/2007 | Dell et al. | |
| 7,318,776 | B2 | 1/2008 | Honda | |
| 7,708,661 | B2 * | 5/2010 | Pflug et al. | 474/94 |
| 7,985,150 | B2 * | 7/2011 | Kamdem | 474/94 |
| 7,998,008 | B2 * | 8/2011 | Kamdem et al. | 474/94 |
| 2005/0250607 | A1 * | 11/2005 | Jansen et al. | 474/74 |
| 2006/0144664 | A1 | 7/2006 | Antchak et al. | |
| 2007/0240964 | A1 | 10/2007 | Saito et al. | |
| 2008/0108442 | A1 * | 5/2008 | Jansen et al. | 464/54 |
| 2008/0139351 | A1 | 6/2008 | Pflug et al. | |
| 2008/0194339 | A1 | 8/2008 | Antchak et al. | |
| 2009/0176583 | A1 | 7/2009 | Dell et al. | |
| 2009/0176608 | A1 | 7/2009 | Jansen et al. | |

FOREIGN PATENT DOCUMENTS

| | | |
|---|---|---|
| JP | 2005321045 A | 11/2005 |
| WO | 2004011818 | 2/2004 |
| WO | 2005057037 A | 6/2005 |
| WO | 2006081657 | 8/2006 |
| WO | 2007003052 | 1/2007 |

* cited by examiner

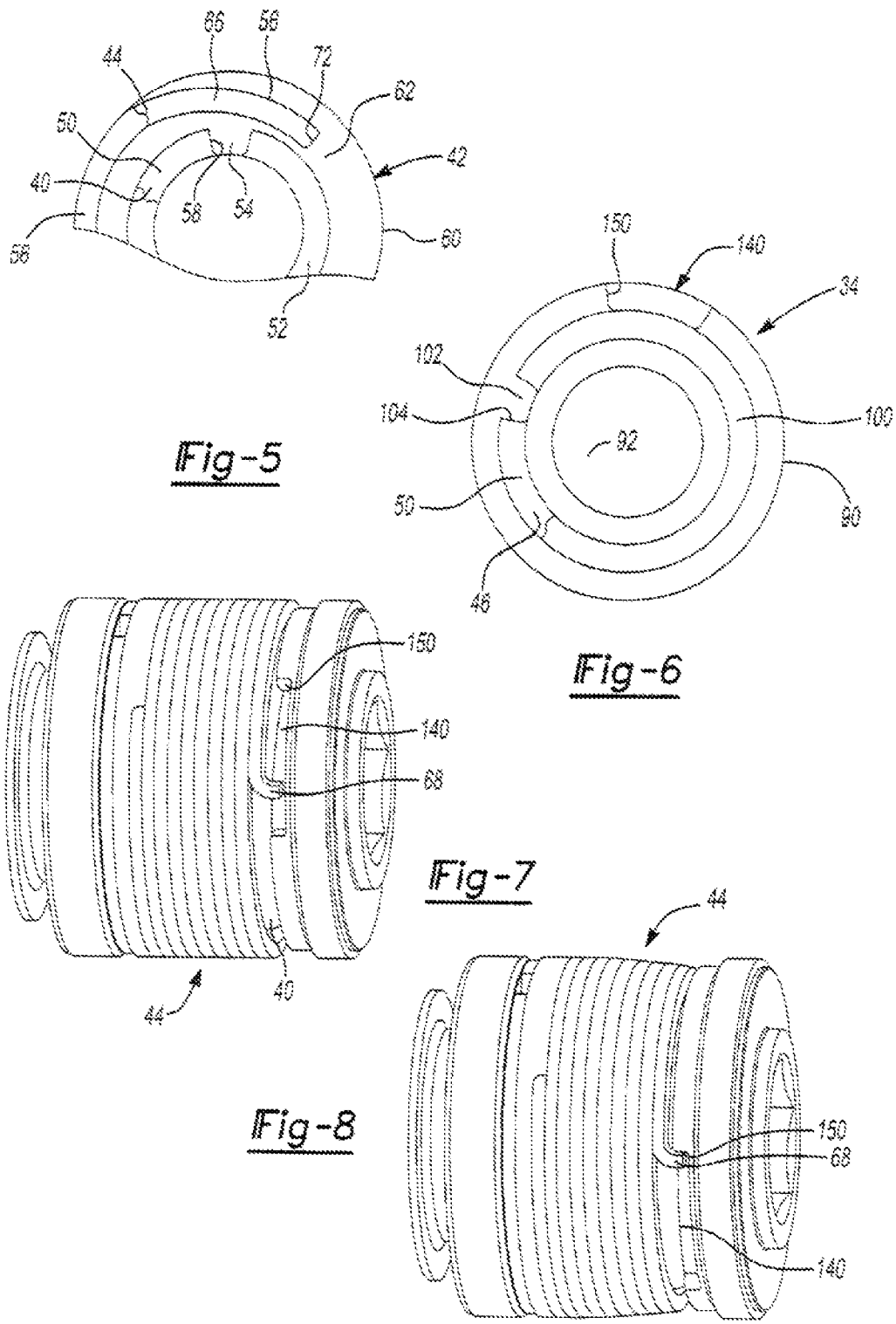

OVER-RUNNING DECOUPLER WITH TORQUE LIMITER

CROSS-REFERENCE TO RELATED APPLICATIONS

This application claims the benefit of U.S. Provisional Patent Application No. 61/108,600 filed Oct. 27, 2008, the disclosure of which is hereby incorporated by reference as if fully set forth in detail herein.

INTRODUCTION

The present disclosure generally relates to drive systems in which rotary power is transmitted between a source of rotary power and one or more driven components and an over-running decoupler is employed to dampen fluctuations in the torsional load transmitted from the source of rotary power to the driven component, as well as to permit one or more of the driven components to be decoupled from and re-coupled to the source of rotary power to reduce or eliminate torsional loads occurring as a result of deceleration of the source of rotary power relative to the driven component. More particularly, the present disclosure relate to a method for inhibiting a resonant condition in an over-running decoupler.

It is known to provide an over-running decoupler in a drive system to permit one or more driven components in the drive system to decouple to reduce or eliminate torsional loads occurring as a result of the deceleration of a source of rotary power relative to the driven component. Exemplary over-running decouplers are disclosed in U.S. patent application Ser. Nos. 10/519,591, 10/542,625, 10/572,128 and 10/581,097 and employ Ser. Nos. 10/519,591, 10/542,625, 10/572,128 and 10/581,097 and employ a torsionally resilient coupling between a decoupler input member and a decoupler output member.

We have noted that operation of an over-running decoupler under some load conditions can cause the torsionally resilient coupling of the over-running decoupler to vibrate at a natural frequency (i.e., resonate), which can significantly reduce the operating life of the over-running decoupler. Resonance in the torsionally resilient coupling may be brought about through the torsional load produced by a driven accessory, through torsional vibrations input to the drive system from a source of rotary power or combinations thereof. Accordingly, there remains a need in the art for a method for attenuating or inhibiting resonance in an over-running decoupler, as well as for an over-running decoupler that can attenuate or inhibit resonance in the torsionally resilient coupling located between the decoupler input member and the decoupler output member.

SUMMARY

In one form, the present teachings provide a method for producing an over-running decoupler that is configured to transmit rotary power between a rotary member and a hub. The over-running decoupler includes a one-way clutch having a clutch spring, a carrier that is coupled to the clutch spring and at least one spring that resiliently couples the carrier to the hub. The method includes: establishing a desired fatigue life of the at least one spring; establishing a design deflection of the at least one spring during resonance, wherein deflection of the at least one spring at the design deflection during resonance does not reduce a fatigue life of the at least one spring below the desired fatigue life; and preventing resonance in the over-running decoupler by controlling a maximum deflection of the at least one spring such that the maximum deflection is less than or equal to the design deflection.

In another form, the teachings of the present disclosure provide a method for operating a drive system having an endless power transmitting element and an over-running decoupler. The over-running decoupler includes a hub, a rotary member and a one-way clutch between the hub and the rotary member. The one-way clutch includes a carrier, a clutch spring and one or more springs disposed between the carrier and the hub. The clutch spring has a first end, which is engaged to the carrier, and is configured to be drivingly coupled to the rotary member. The method includes: operating the drive system under a first set of operating conditions to cause coupling of the clutch spring to the rotary member to facilitate transmission of torque through the over-running decoupler; and decoupling the over-running decoupler in response to deflection of the at least one spring by an amount that is greater than or equal to a predetermined spring deflection. The predetermined spring deflection is selected to inhibit onset of a resonant condition in the at least one spring.

In a further form, the teaching of the present disclosure provide a method for producing an over-running decoupler that is configured to transmit rotary power between a rotary member and a hub. The over-running decoupler includes a clutch having a clutch spring, a carrier that is coupled to the clutch spring and at least one spring that resiliently couples the carrier to the hub. The method includes: establishing a desired fatigue life of the at least one spring; establishing a design torque that may be, transmitted through the at least one spring during resonance, wherein transmission of the design torque through the at least one spring during resonance does not reduce a fatigue life of the at least one spring below the desired fatigue life; and preventing resonance in the over-running decoupler by controlling a maximum torque transmitted through the decoupler such that the maximum torque is less than or equal to the design torque.

In yet another form, the present teachings provide an over-running decoupler having a rotary member, a hub, a one-way clutch that is disposed between the hub and the rotary member, and a resonance-inhibiting clutch. The one-way clutch includes a spring carrier, a helical wrap spring and a torsionally resilient coupling between the spring carrier and the hub. The helical wrap spring includes a plurality of coils that are engaged to the rotary member, a first end and a second end. The first end of the helical wrap spring is drivingly engaged to the spring carrier. The resonance-inhibiting clutch is configured to cause the one-way clutch to disengage the rotary member when a deflection of the torsionally resilient coupling exceeds a predetermined deflection.

Further areas of applicability will become apparent from the description provided herein. It should be understood that the description and specific examples are intended for purposes of illustration only and are not intended to limit the scope of the present disclosure, its application and/or uses in any way.

BRIEF DESCRIPTION OF THE DRAWINGS

The drawings described herein are for illustration purposes only and are not intended to limit the scope of the present disclosure in any way. Similar or identical elements are given consistent identifying numerals throughout the various figures.

FIG. 5 is a partial plan view of a portion of the over-running decoupler of FIG. 1, illustrating an exemplary configuration of a portion of a clutch spring carrier;

FIG. 6 is a plan view of a portion of the over-running decoupler of FIG. 1, illustrating an exemplary configuration of the hub;

FIGS. 7 and 8 are perspective views of a portion of the over-running decoupler of FIG. 1, illustrating the resonance-inhibiting clutch in an inoperative condition and an operative condition, respectively;

DETAILED DESCRIPTION

Figure 1:
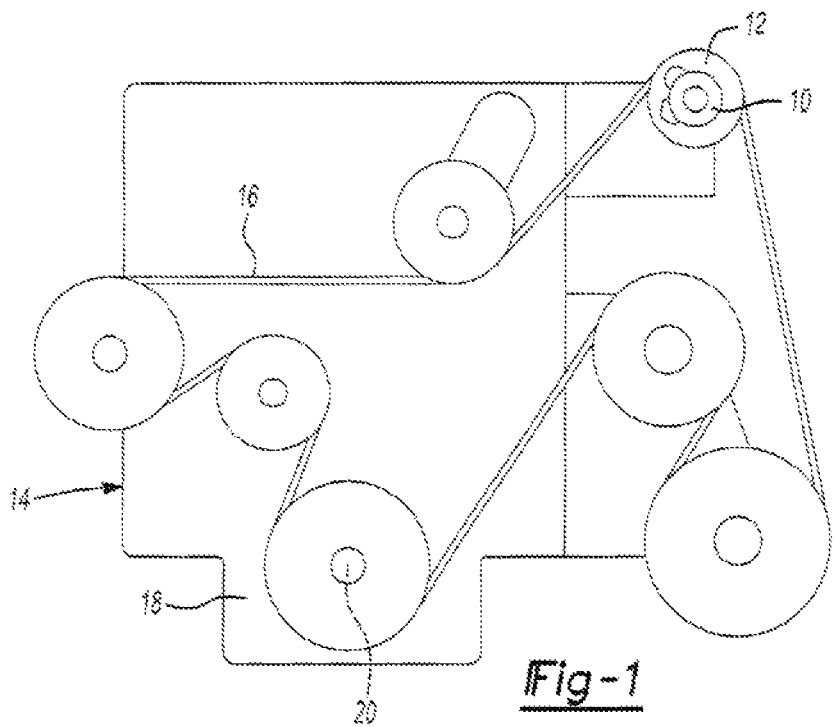
FIG. 1 is a schematic illustration of the front of an engine with a front engine accessory drive system that employs an over-running decoupler constructed in accordance with the teachings of the present disclosure, the over-running decoupler being employed to transmit rotary power to an alternator.
Figure 2:
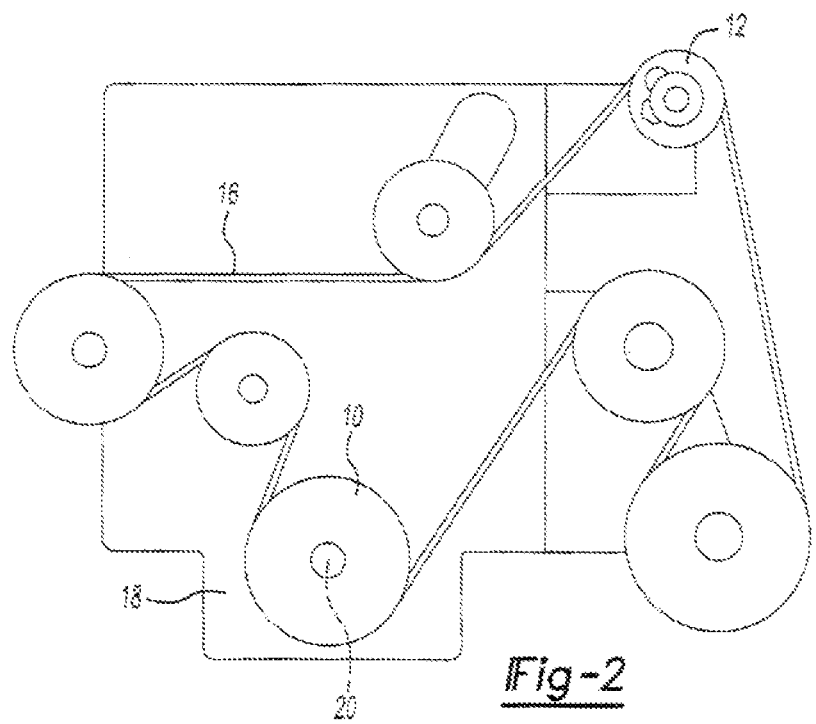
FIG. 2 is a schematic illustration of the front of an engine with a front engine accessory drive system that employs an over-running decoupler constructed in accordance with the teachings of the present disclosure, the over-running decoupler being employed to transmit rotary power from the crankshaft of the engine to an endless power transmitting element.

With reference to FIG. 1 of the drawings, an over-running decoupler constructed in accordance with the teachings of the present disclosure is generally indicated by reference numeral 10. The particular over-running decoupler 10 illustrated is particularly suited for use with a driven device 12, such as an alternator or a supercharger, in a drive system 14 that employs an endless power transmitting element 16, such as a belt or a chain, from a source of rotary power 18, such as an engine or a transmission. Those of skill in the art will appreciate that the over-running decoupler 10 could be configured for use in another type of drive system (e.g., a drive system employing gears) and/or that the over-running decoupler 10 could be employed to transmit rotary power from a drive shaft 20 into the drive system as shown in FIG. 2. Accordingly, it will be appreciated that the teachings of the present disclosure have application in a crankshaft decoupler, similar to those which are disclosed in U.S. patent application Ser. Nos. 10/572,128 and 10/542,625, the disclosures of which are hereby incorporated by reference as if fully set forth in detail herein.

Figure 3:
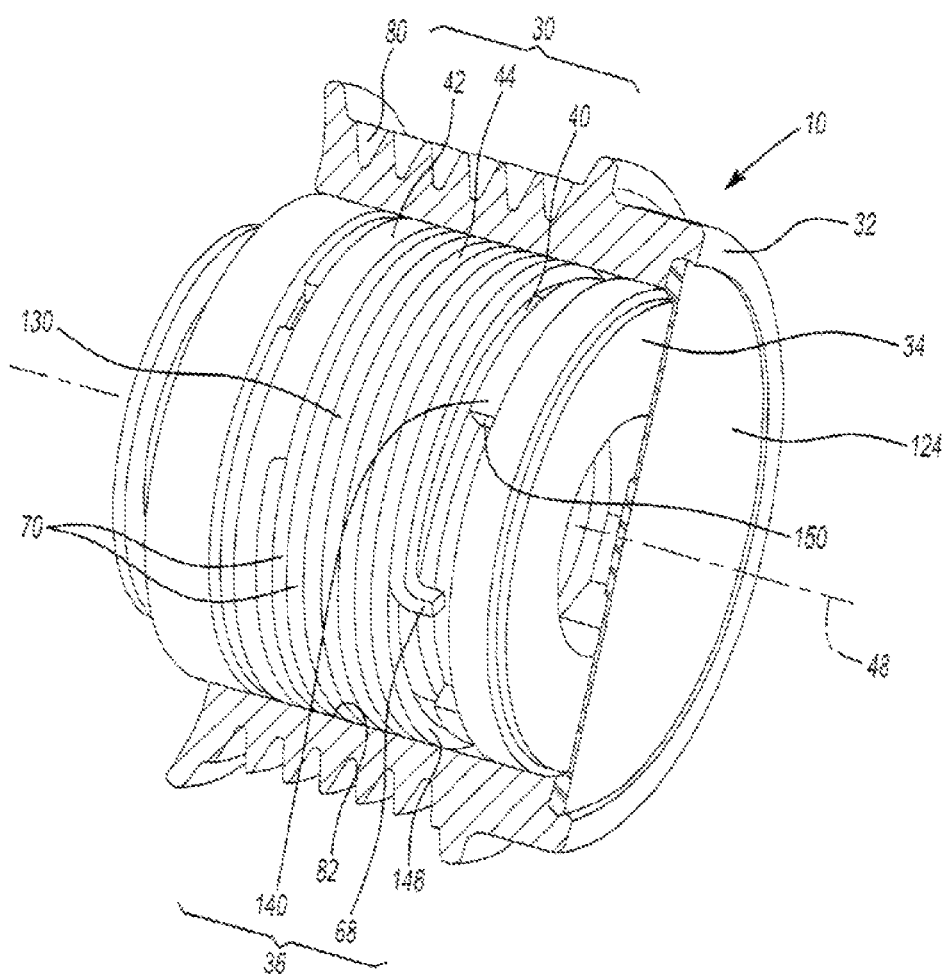
FIG. 3 is a perspective, partly cut-away view of the over-running decoupler of FIG. 1.
Figure 4:
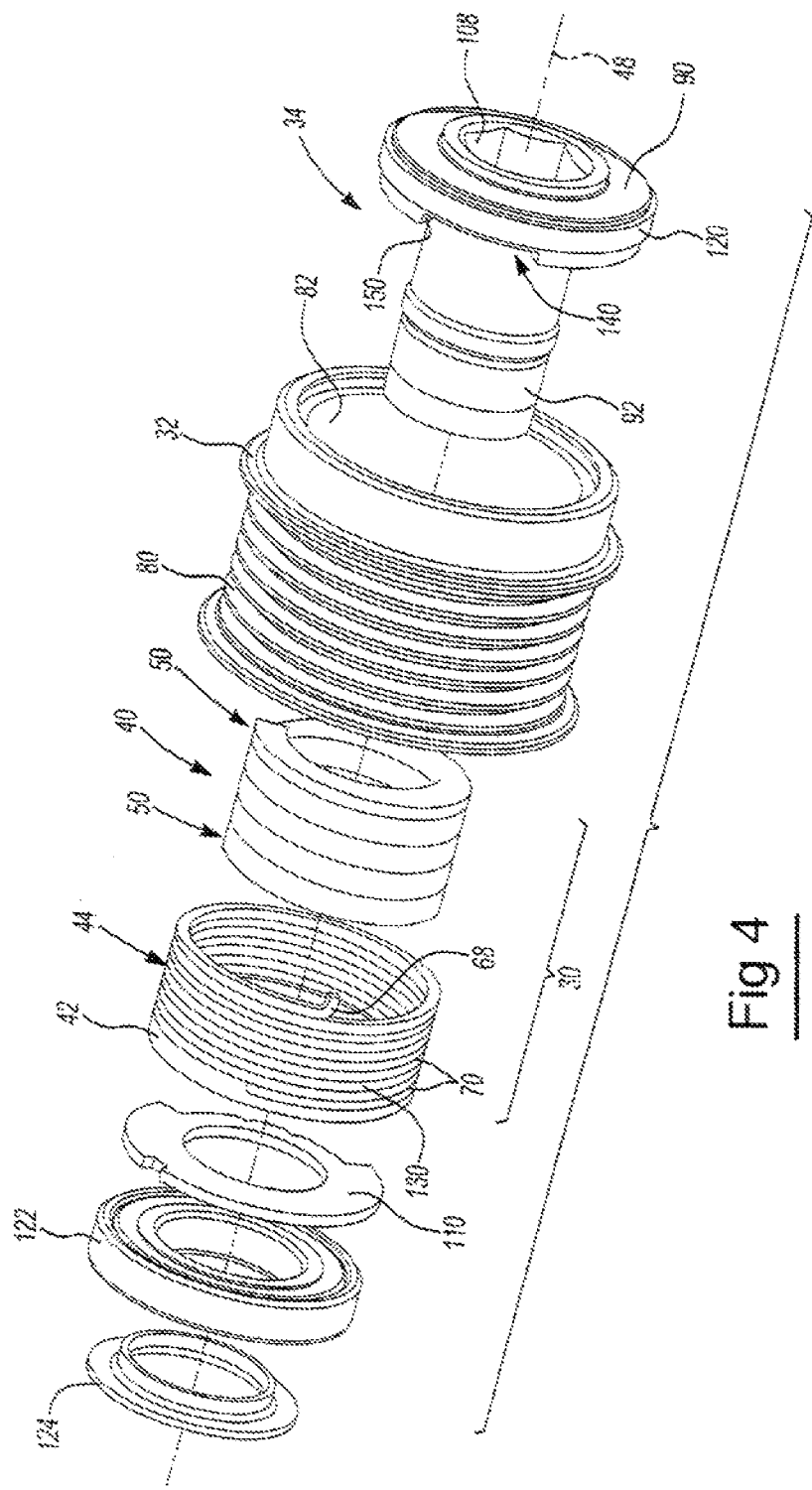
FIG. 4 is an exploded perspective view of a portion of the over-running decoupler of FIG. 1.

With reference to FIGS. 3 and 4, the over-running decoupler 10 can include a one-way clutch 30, a rotary member 32, a hub 34, and a resonance-inhibiting clutch 36. Except as described herein, the one-way clutch 30, the hub 34 and the rotary member 32 can be configured in the manner described in U.S. patent application Ser. Nos. 10/519,591 and/or 10/542,625.

The one-way clutch 30 can comprise a resilient torque transmitting coupling 40, a clutch spring carrier 42 and a clutch spring 44. The resilient torque transmitting coupling 40 is configured to torsionally resiliently couple the clutch spring carrier 42 and the hub 34 and can comprise one or more springs. In the particular example provided, the resilient torque transmitting coupling 40 comprises a single helical torsion spring 46 that is disposed concentrically about the rotary axis 48 of the over-running decoupler 10, but it will be appreciated that other torsionally-compliant couplings could be employed, such as two or more arcuate coil compression springs as disclosed in U.S. patent application Ser. No. 10/572,128. The torsion spring 46 can be formed of an appropriate spring wire with a desired cross-sectional shape (e.g., round, square, rectangular) and can have ends that can be ground or unground. In the particular example provided the torsion spring 46 has closed ends 50 that are not ground.

With reference to FIGS. 4 and 5, the clutch spring carrier 42 can be torsionally coupled to the resilient torque transmitting coupling 40, as well as engaged to the clutch spring 44. In the particular example provided, the clutch spring carrier 42 comprises a helical raceway 52, which is configured to abut a corresponding one of the ends 50 of the torsion spring 46, an abutment 54, and a clutch spring groove 56. The abutment 54 can be configured to abut an axial end face 58 of the wire that forms the torsion spring 46 when the end 50 of the torsion spring 46 is abutted against the helical raceway 52. The clutch spring groove 56 can extend from an outer circumferential surface 60 of the clutch spring carrier 42 into a radially interior portion of the clutch spring carrier 42 and can terminate at a clutch spring abutment 62.

The clutch spring 44 can be formed of a spring wire material and can comprise a first end 66, a second end 68 and a plurality of helical coils 70 between the first and second ends 66 and 68. The spring wire material can have a desired cross-sectional shape, such as square, rectangular or round, and can be uncoated (i.e., bare) or coated with an appropriate plating and/or coating. Moreover, a lubricant, such as a grease lubricant, can be employed on the helical coils 70 of the clutch spring 44. The first end 66 can be received into the clutch spring groove 56 in an axial direction and can cooperate with the clutch spring groove 56 such that the first end 66 is retained to the clutch spring carrier 42 in radial and circumferential directions. Moreover, an axial end 72 of the wire that forms the first end 44 can abut the clutch spring abutment 62 so that rotary power may be transmitted between the spring carrier 42 and the clutch spring 44 (i.e., from the spring carrier 42 to the clutch spring 44 or from the clutch spring 44 to the spring carrier 42) via contact between the clutch spring abutment 62 and the axial end 72 of the first end 66.

Returning to FIGS. 3 and 4, the rotary member 32 can have an external surface 80, which is shaped or otherwise configured to transmit rotary power in a particular drive system, and an internal cylindrical surface 82. In the example provided, the rotary member 32 is a pulley with an external surface that is configured to engage a poly-vee belt, but it will be appreciated that the rotary member 32 could be configured with a different pulley configuration, or with the configuration of a roller, a friction roller, a sprocket or a gear, for example. The internal cylindrical surface 82 can be sized to frictionally engage the helical coils 70 of the clutch spring 44. In the particular example provided, the helical coils 70 of the clutch spring 44 engage the internal cylindrical surface 82 with an interference fit.

With reference to FIGS. 4 and 6, the hub 34 can be torsionally coupled to the resilient torque transmitting coupling 40 and can include a head or flange portion 90 and a shank portion 92. In the particular example provided, the flange portion 90 comprises a helical raceway 100, which is configured to abut a corresponding one of the ends 50 of the torsion spring 46 and an abutment 102 that can be configured to abut an axial end face 104 of the wire that forms the torsion spring 46 when the end 50 of the torsion spring 46 is abutted against the helical raceway 100. The shank portion 92 can be configured to be coupled to an input member of a driven accessory 12 (FIG. 1) or to an output member 16 (FIG. 1A) of a source of rotary power through any appropriate means, such as an interference fit, a mating spline or toothed geometry, threads, threaded fasteners, keys, etc., such that the hub 34 will rotate with the input member of the accessory or the output member of power source. The hub 34 may include one or more features that aid in the installation of the over-running decoupler 10, such as a hex recess 108 that can be employed to hold or turn the hub 34 relative to the input member of the accessory or the output member of power source. The shank portion 92 can be received through the one-way clutch 30 such that the clutch spring carrier 42 is rotatably disposed thereon.

A thrust washer 110 can be fixedly coupled to the shank portion 92 to axially retain the one-way clutch 30 to the hub 34. In the particular example provided, the thrust washer 110 can also maintain the torsion spring 46 in an axially compressed state. The thrust washer 110 and the clutch spring carrier 42 can be configured to cooperate with one another as is disclosed in U.S. application Ser. No. 10/581,097 to inhibit relative rotation between the helical raceway 52 (FIG. 5) of the clutch spring carrier 42 and the corresponding end 50 of the torsion spring 46.

Bearings and/or bushings can be employed to rotatably support the rotary member 32 on the hub 34. In the particular example provided, a bushing 120 can be disposed between the flange portion 90 and the rotary member 32, while a sealed or unsealed bearing assembly 122 employing bearing balls or rollers can be disposed between the shank portion 92 and the rotary member 32. One or more seals or shields 124 can also be provided between the rotary member 32 and the shank portion 92 to inhibit the ingress of dust, debris and moisture into the interior of the over-running decoupler 10, as well as to inhibit the egress of any lubricant on the helical coils 70 of the clutch spring 44 from the interior of the over-running decoupler 10.

With renewed reference to FIGS. 3 and 4, when rotary power is to be transmitted through the over-running decoupler 10, relative rotation between the rotary member 32 and the hub 34 in a first rotational direction tends to cause the clutch spring 44 to uncoil such that its outer circumferential surface 130 grippingly engages the internal cylindrical surface 82 of the rotary member 32 to thereby enable the transmission of rotary power through the over-running decoupler 10. If the rotational inertia of an object (i.e., the driven accessory in FIG. 1 or the drive system in FIG. 2) is sufficiently high to cause relative rotation between the rotary member 32 and the hub 34 in a second, opposite rotational direction by a sufficient amount, the clutch spring 44 will tend to coil more tightly such that the rotary member 32 and hub may rotate independently of one another.

The resonance-inhibiting clutch 36 can comprise any means for disengaging the one-way clutch 30 when rotary power is transmitted through the over-running decoupler 10 to limit deflection of the resilient torque transmitting coupling 40. In the particular example provided, the resonance-inhibiting clutch 36 comprises the second end 68 of the clutch spring 44 and a clutch feature 140 formed on the flange portion 90 of the hub 34.

The second end 68 of the clutch spring 44 can extend away from the helical coils 70 in a desired direction. In the particular example provided, the second end 68 extends parallel to the rotary axis 48 of the over-running decoupler 10 in a tubular zone 146 defined by the helical coils 70. It will be appreciated, however, that the second end 68 could extend in another direction, such as radially inwardly or radially outwardly.

The clutch feature 140 can comprise a clutch member 150 that can engage the second end 68 of the clutch spring 44 to cause the clutch spring 44 to coil tighter and thereby disengage the internal cylindrical surface 82 in response to deflection of the resilient torque transmitting coupling 40 by a predetermined amount. In the particular example provided, an arc-shaped window or aperture is formed in the flange portion 90 and the clutch member 150 is formed or defined by a side of the aperture. The second end 68 of the clutch spring 44 can be disposed within the aperture when rotary power is transmitted through the over-running decoupler 10 and the clutch member 150 can rotate toward and away from the second end 68 of the clutch spring 44 as deflection of the resilient torque transmitting coupling 40 increases and decreases, respectfully. As noted above, deflection of the resilient torque transmitting coupling 40 at a predetermined design deflection will result in contact between the clutch member 150 and the second end 68 that causes the clutch spring 44 to coil more tightly and thereby disengage the rotary member 32. FIG. 7 illustrates the relative positioning of the second end 68 and the clutch member 150 when the deflection of the resilient torque transmitting coupling 40 is at a given magnitude that is less than the predetermined amount, whereas FIG. 8 illustrates the relative positioning of the second end 68 and the clutch member 150 when the deflection of the resilient torque transmitting coupling 40 is at a magnitude that is equal to the predetermined amount. It will be appreciated that depending on the configuration of the clutch spring 44 and the magnitude of the predetermined amount of deflection of the resilient torque transmitting coupling 40, more or less tightening (coiling) of the clutch spring 44 may be required to cause the clutch spring 44 to disengage the internal cylindrical surface 82 than that which is illustrated in FIG. 8.

Figure 9:
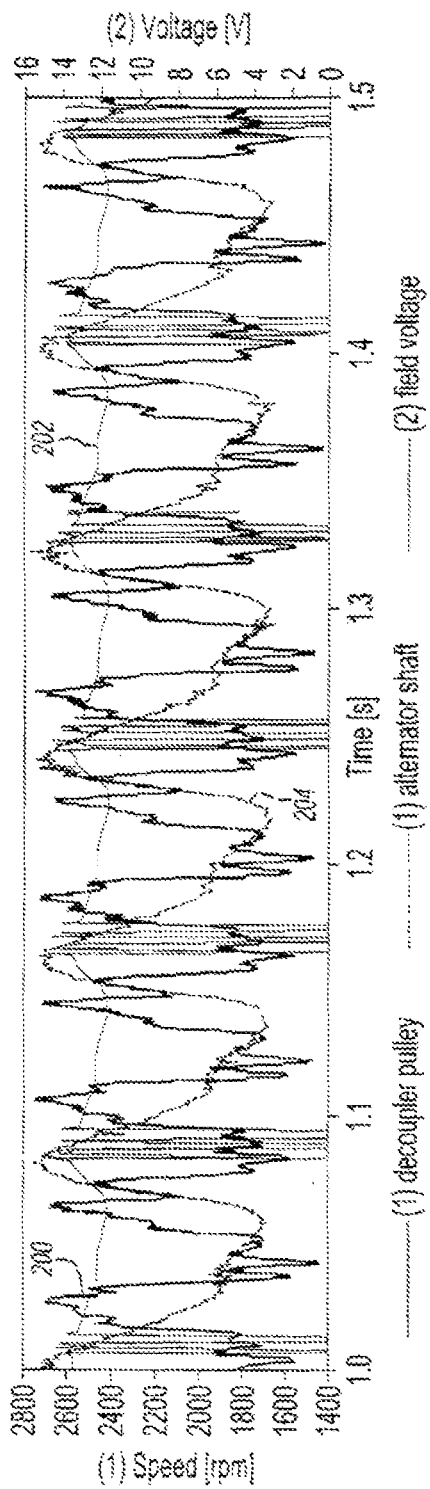
FIG. 9 is a graph with plots depicting several operational characteristics associated with the operation of an alternator with a prior over-running decoupler.

With reference to FIG. 9, plots depicting various aspects of the operation of an alternator driven through a prior art over-running decoupler are illustrated. Plot 200 represents the rotational speed of the pulley of the prior art over-running decoupler as a function of time, plot 202 represents the voltage of the alternator field as a function of time, and plot 204 represents the rotational speed of the hub of the prior art over-running decoupler as a function of time. Although the testing that produced these plots was performed on a test bench, it should be appreciated that the testing was configured to simulate the driving of the alternator through a front engine accessory drive of the type that is commonly employed in automotive vehicles. In this regard, we note that while the change in rotational speed of the pulley may seem large, it should be appreciated that the diameter of the alternator pulley is relatively small as compared with the crankshaft pulley so that relatively small variances in engine rotational speed are magnified by an amount that is approximately related to a ratio of the circumference of the crankshaft pulley to the circumference of the alternator pulley.

Absent other torsional inputs, the prior art over-running decoupler is configured to attenuate the effect on the hub of the oscillation in the speed of the pulley and as such, one would have expected the rotational speed of hub to have oscillations having peak-to-peak variation of a smaller magnitude than the magnitude of the peak-to-peak variation in the rotational speed of the pulley.

Figure 10:
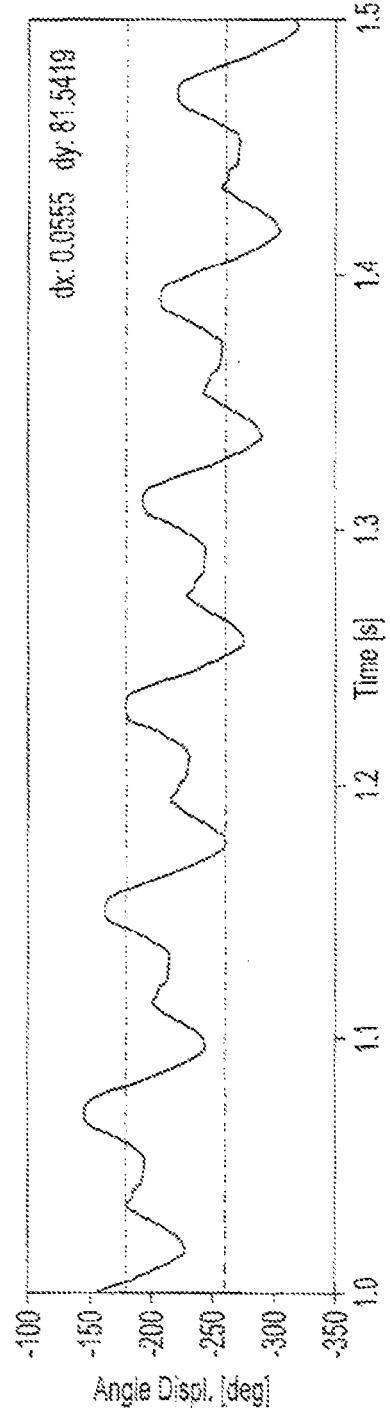
FIG. 10 is a graph with a plot depicting a rotational displacement of the pulley and hub of the prior over-running decoupler.

In plot 202, sudden changes in the magnitude of the alternator field voltage occur when the regulator of the alternator switches off or on. Since the torque required to rotate the alternator is related to the alternator field voltage, the switching off and on of the alternator produces sudden changes in the torsional loading of the over-running decoupler. The torsional vibration input to the prior over-running decoupler via the pulley and the torsional load input to the prior over-running decoupler via the hub combine to drive the torsionally resilient coupling into resonance as is shown in FIG. 10, which illustrates the angular displacement of the hub relative to the pulley. The dashed horizontal lines in FIG. 10 depict the upper and lower bounds of the angular displacement for a given cycle as being approximately 81.5 degrees over a 0.0555 second interval.

Figure 11:
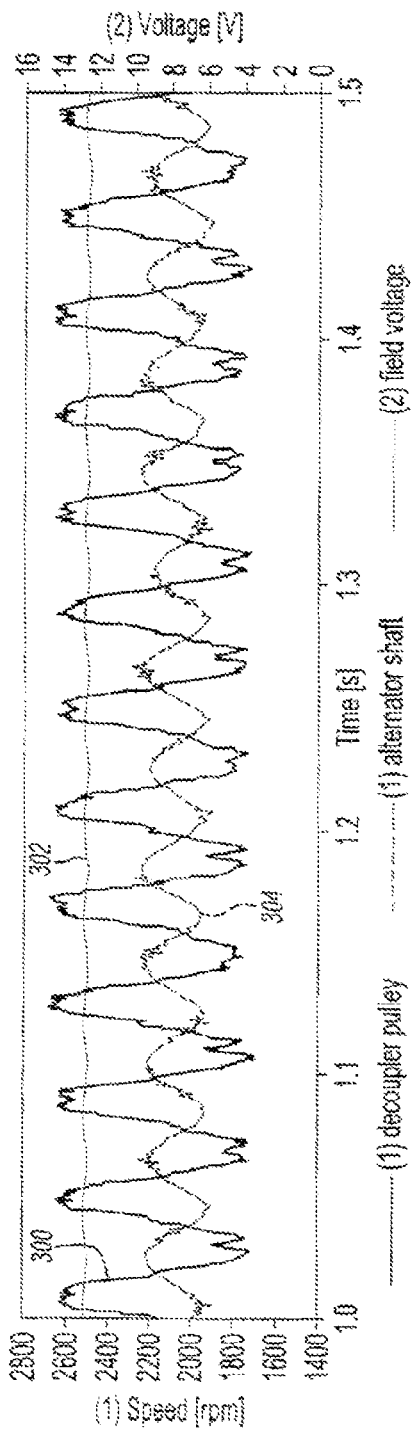
FIG. 11 is a graph with plots depicting several operational characteristics associated with the operation of an alternator with the over-running decoupler of FIG. 1.
Figure 12:
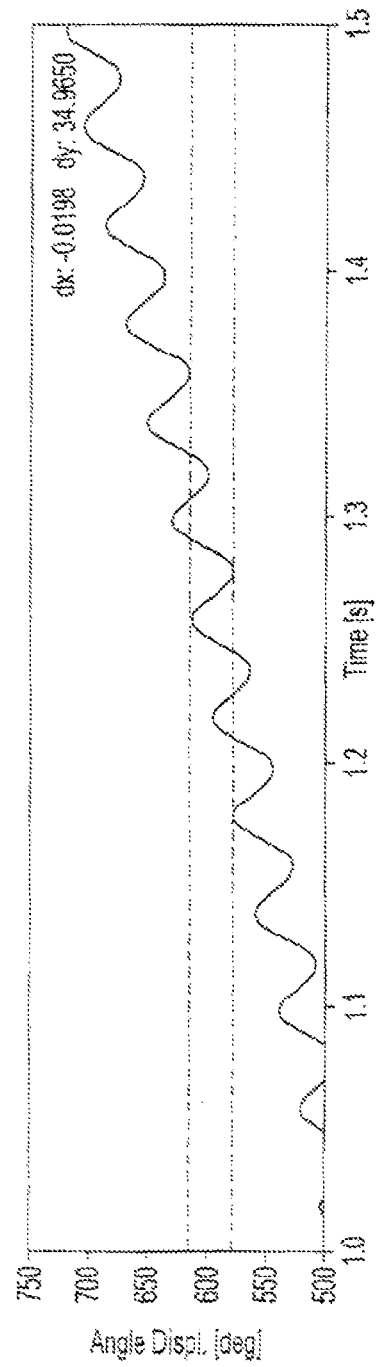
FIG. 12 is a graph with a plot depicting a rotational displacement of the rotary member and hub of the over-running decoupler of FIG. 1.

Plots depicting various aspects of the operation of an alternator driven through the over-running decoupler 10 (FIG. 3) are illustrated in FIGS. 11 and 12. In FIG. 11, plot 300 represents the rotational speed of the rotary member 32 (FIG. 3) as a function of time, plot 302 represents the voltage of the alternator field as a function of time, and plot 304 represents the rotational speed of the hub 34 (FIG. 3) as a function of time. In FIG. 12, the plot depicts the angular displacement of the hub 34 (FIG. 3) relative to the rotary member 32 (FIG. 3). The dashed horizontal lines in FIG. 12 depict the upper and lower bounds of the angular displacement for a given cycle as being approximately 35.0 degrees over a 0.0198 second interval. As with the above-described example, the testing that produced these plots was performed on a test bench under conditions identical to that which were employed to generate the plots associated with FIGS. 9 and 10. As shown in FIG. 12, however, the over-running decoupler 10 (FIG. 1) is not in resonance.

With renewed reference to FIGS. 3 and 4, it will be appreciated that a method is provided herein in for the operation of a drive system having an over-running decoupler with a resilient torque transmitting coupling. More specifically, the drive system can be operated under a first set of operating conditions to cause coupling of the one-way clutch 30 to the rotary member 32 to facilitate transmission of torque through the over-running decoupler 10; the over-running decoupler can be decoupled in response to deflection of the resilient torque transmitting coupling 40 in the one-way clutch 30 by an amount that is equal to a predetermined deflection that is selected to inhibit onset of a resonant condition in the resilient torque transmitting coupling 40.

A method is also provided herein for producing an over-running decoupler constructed in accordance with the teachings of the present disclosure (i.e., a non-resonating over-running decoupler). The method can comprise: establishing a desired fatigue life of the resilient torque transmitting coupling 40 (or the over-running decoupler 10); establishing a design deflection of the resilient torque transmitting coupling 40; and preventing resonance in the resilient torque transmitting coupling 40 by controlling a maximum deflection of the resilient torque transmitting coupling 40 such that the maximum deflection experienced by the resilient torque transmitting coupling 40 is less than or equal to the design deflection.

It will be appreciated that the desired fatigue life of the resilient torque transmitting coupling 40 may be established in any number of ways, such as through analytical means, experiment, choice, or combinations thereof. Typically the over-running decoupler 10 would be required to survive a predetermined regimen or systematic plan involving a predetermined quantity of test or operating cycles. For example, an over-running decoupler employed in a front engine accessory drive of an automotive vehicle may be required to survive a test regimen comprising a predetermined quantity of engine starts, such as 500,000 engine starts. A more sophisticated test regimen may include a first quantity of engine starts, a second quantity of engine idle segments (simulating the idling of the engine of the vehicle for a predetermined quantity of time), a third quantity of acceleration segments (simulating the acceleration of the engine of the vehicle over a predetermined quantity of time and at a predetermined rate), and a fourth quantity of deceleration segments (simulating the deceleration of the engine of the vehicle over a predetermined quantity of time and at a predetermined rate). In such situation, it may be desirable to employ an analytical means, such as simulation software, to initially design the resilient torque transmitting coupling 40, then modify the resilient torque transmitting coupling 40 in view of criteria involving the cost or manufacturability of the torque transmitting device (e.g., the decoupler assembly 10), and thereafter modify the resilient torque transmitting coupling 40 in response to data collected during testing. Alternatively, the desired fatigue life may established simply through choice, for example through the copying of a resilient torque transmitting coupling 40 in a non-resonating over-running decoupler known to have a desired fatigue life, or the choosing of a non-resonating over-running decoupler from one or more non-resonating over-running decouplers based on at least one of an inertia of the device or devices that are to be driven by the non-resonating over-running decoupler and a peak torque to drive the device or devices that are to be driven by the non-resonating over-running decoupler.

The design deflection is a deflection that the resilient torque transmitting coupling 40 may experience during resonance without reducing the fatigue life of the resilient torque transmitting coupling below the desired fatigue life. The design deflection is not necessarily the maximum deflection and may be established in any number of ways, such as through analytical means, experiment, choice or combinations thereof. For example, the design deflection may be set or chosen at a level that is below the maximum deflection that the resilient torque transmitting coupling 40 may experience during resonance without reducing the fatigue life of the resilient torque transmitting coupling 40 below the desired fatigue life. Alternatively, the design deflection may be established simply through choice, for example through the copying of operational or physical characteristics from a non-resonating over-running decoupler known to have a desired fatigue life.

As deflection of the resilient torque transmitting coupling 40 is directly related to the amount of torque that is transmitted through the resilient torque transmitting coupling 40, it will be appreciated that the design deflection can be sized large enough to ensure that the component or components receiving rotary power through the non-resonating over-running decoupler may be driven under all circumstances. For example, it may be desirable in some situations to establish a peak torque of the device or devices that are to receive rotary power through the non-resonating over-running decoupler and to establish that the deflection of the resilient torque transmitting coupling 40 when transmitting the peak torque is less than the design deflection.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A method for producing an over-running decoupler that is configured to transmit rotary power between a rotary member and a hub, comprising:
    providing a one-way clutch having a wrap spring, and a carrier that is coupled to the wrap spring;
    providing at least one isolation spring that resiliently couples the carrier to the hub;
    controlling a maximum deflection of the at least one isolation spring, wherein below the maximum deflection during relative rotation is a first direction between the rotary member and the hub, the one-way clutch couples the rotary member and the hub,
    and wherein upon reaching the maximum deflection during relative rotation in the first direction an end of the wrap spring engages a limit surface on one of the rotary member and the hub to prevent radial expansion of the wrap spring clutch to limit torque transfer between the rotary member and the hub,
    and wherein during relative rotation in a second direction between the rotary member and the hub, the one-way clutch decouples the rotary member and the hub.

2. The method of claim 1, wherein the maximum deflection is selected so as not to reduce a fatigue life of the at least one isolation spring below a desired fatigue life.

3. The method of claim 1, wherein the maximum deflection is selected at least partly based on a rotational inertia of at least one device that is driven through the over-running decoupler.

4. The method of claim 1, wherein the maximum deflection is selected at least partly based on a peak torque of one or more devices driven through the over-running decoupler.

5. The method of claim 1, further comprising establishing a peak drive torque of a device that is to receive rotary power from the over-running decoupler and wherein the maximum deflection of the at least one isolation spring is greater than a deflection of the at least one isolation spring when a torque having a magnitude that is equal to the peak drive torque is transmitted through the over-running decoupler.

6. A method for operating a drive system having an endless power transmitting element and an over-running decoupler, comprising:
    providing a hub, a rotary member and a one-way clutch between the hub and the rotary member, the one-way clutch comprising a carrier, and a wrap spring, the wrap spring having a first end, which is engaged to the carrier, the wrap spring being configured to be drivingly coupled to a radially inner surface of the rotary member;
    providing at least one isolation spring disposed between the carrier and the hub;
    operating the drive system under a first set of operating conditions to cause coupling of the wrap spring to the rotary member to facilitate transmission of torque through the over-running decoupler;
    limiting torque transfer between the wrap spring and the rotary member in response to an increasing torque transfer resulting in a deflection of the at least one isolation spring by an amount that is greater than or equal to a predetermined spring deflection; and
    operating the drive system under a second set of operating conditions to cause decoupling of the wrap spring from the rotary member to prevent transmission of torque through the over-running decoupler,
    wherein the wrap spring has a second end on a side that is opposite the first end, the second end being contacted by one of the rotary member and the hub to coil at least a portion of the wrap spring radially inwardly away from a radially inner surface of the rotary member to thereby initiate the decoupling of the over-running decoupler when the amount by which the at least one isolation spring has deflected is greater than or equal to the predetermined spring deflection.

7. The method of claim 6, wherein the at least one isolation spring comprises a helical coil spring that is disposed concentrically about a rotational axis of the over-running decoupler.

8. The method of claim 6, wherein the rotary member comprises a pulley, a roller or a sprocket.

9. The method of claim 6, wherein the predetermined spring deflection is selected to provide the at least one isolation spring with at least a predetermined fatigue life.

10. A method for producing an over-running decoupler that is configured to transmit rotary power between a rotary member and a hub, comprising:
    providing a one-way clutch having a wrap spring, and a carrier that is coupled to the wrap spring;
    providing at least one isolation spring that resiliently couples the carrier to the hub;
    controlling a maximum torque of the at least one spring, wherein below the maximum torque during relative rotation in a first direction between the rotary member and the hub, the one-way clutch couples the rotary member and the hub,
    and wherein upon reaching the maximum torque an end of the wrap spring engages a limit surface on one of the rotary member and the hub to prevent radial expansion of the wrap spring clutch to limit torque transfer between the rotary member and the hub,
    and wherein during relative rotation in a second direction between the rotary member and the hub, the one-way clutch decouples the rotary member and the hub.

11. The method of claim 10, wherein the maximum torque so as not to reduce the fatigue life of the at least one isolation spring below the desired fatigue life.

12. The method of claim 10, further comprising establishing a peak drive torque of a device that is to receive rotary power from the over-running decoupler and wherein the maximum torque that is transmitted through the over-running decoupler is greater than the peak drive torque.

13. The method of claim 10, wherein the maximum torque is selected at least partly based on a rotational inertia of at least one device that is driven through the over-running decoupler.

14. The method of claim 10, wherein the maximum torque is selected at least partly based on a peak torque of one or more devices driven through the over-running decoupler.

* * * * *